United States Patent
Saha et al.

(10) Patent No.: US 7,600,186 B2
(45) Date of Patent: Oct. 6, 2009

(54) GENERATING A SYNONYM DICTIONARY REPRESENTING A MAPPING OF ELEMENTS IN DIFFERENT DATA MODELS

(75) Inventors: Rakesh Saha, Bangalore (IN); Aninda Sengupta, Bangalore (IN); Manoj Gupta, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 408 days.

(21) Appl. No.: 11/164,362

(22) Filed: Nov. 21, 2005

(65) Prior Publication Data

US 2007/0083503 A1    Apr. 12, 2007

(30) Foreign Application Priority Data

Oct. 7, 2005    (IN)    .................. 1439/CHE/2005

(51) Int. Cl.
 *G06F 17/27* (2006.01)
(52) U.S. Cl. ...................... 715/260; 715/259
(58) Field of Classification Search ................ 715/200, 715/229, 259, 260
 See application file for complete search history.

(56) References Cited

U.S. PATENT DOCUMENTS

| | | | | |
|---|---|---|---|---|
| 6,226,650 | B1 * | 5/2001 | Mahajan et al. | 707/201 |
| 7,107,297 | B2 * | 9/2006 | Yellepeddy et al. | 707/204 |
| 7,191,192 | B2 * | 3/2007 | Yellepeddy et al. | 707/104.1 |
| 2003/0120651 | A1 * | 6/2003 | Bernstein et al. | 707/6 |
| 2003/0145003 | A1 * | 7/2003 | Yellepeddy et al. | 707/6 |
| 2004/0064502 | A1 * | 4/2004 | Yellepeddy et al. | 709/203 |
| 2005/0027681 | A1 * | 2/2005 | Bernstein et al. | 707/1 |
| 2005/0060324 | A1 * | 3/2005 | Johnson et al. | 707/100 |
| 2005/0060332 | A1 * | 3/2005 | Bernstein et al. | 707/100 |
| 2006/0069677 | A1 * | 3/2006 | Tanigawa et al. | 707/4 |
| 2006/0160055 | A1 * | 7/2006 | Osoegawa | 434/350 |

* cited by examiner

*Primary Examiner*—Stephen S Hong
*Assistant Examiner*—Gregory J Vaughn
(74) *Attorney, Agent, or Firm*—Narendra Reddy Thappeta (57) ABSTRACT

Additional synonym pairs are inferred from a pair of schema elements (of different schemas) mapped by a user, and the inferred pairs are added to a dictionary. According to one aspect of the present invention, a mapped pair is inferred as a synonym pair if the elements of the mapped pair cannot be mapped according to a program logic otherwise. According to one more aspect of the present invention, the parents of the mapped elements are also inferred as synonym pairs if sufficient peer (to the mapped elements) elements are already mapped or considered synonyms.

14 Claims, 12 Drawing Sheets

```
401 →  <?xml version="1.0" encoding="UTF-8"?>

403 →  <xsd:schema xmlns:xsd="http://www.w3.org/2001/XMLSchema"
405 →          targetNamespace="http://www.oracle.com/ProcessConnect/
       dictionarySrc"
407 →          xmlns="http://www.oracle.com/ProcessConnect/dictionarySrc">
409 →  <xsd:element name="srcContainer" type="srcContainerType"/>

411 →  <xsd:complexType name="srcContainerType">
413 →    <xsd:sequence>
415 →      <xsd:element name="srcExactMatch" type="srcExactMatchType"/>
417 →      <xsd:element name="srcIgnoreCase" type="srcIgnoreCaseType"/>
419 →      <xsd:element name="newDictionary" type="newDictionaryType"/>
421 →      <xsd:element name="srcTokenize" type="srcTokenizeType"/>
423 →      <xsd:element name="negative" type="negativeType"/>
425 →    </xsd:sequence>
427 →  </xsd:complexType>

429 →  <xsd:complexType name="newDictionaryType">
431 →    <xsd:sequence>
433 →      <xsd:element name="abc">
435 →        <xsd:complexType>
437 →          <xsd:sequence>
439 →            <xsd:element name="city" type="xsd:string"/>
441 →            <xsd:element name="street" type="xsd:string"/>
443 →          </xsd:sequence>
445 →        </xsd:complexType>
447 →      </xsd:element>
449 →    </xsd:sequence>
451 →  </xsd:complexType>

453 →  <xsd:complexType name="srcExactMatchType">
455 →    <xsd:sequence>
457 →      <xsd:element name="petrol" type="xsd:string"/>
459 →      <xsd:element name="car" type="xsd:string"/>
461 →    </xsd:sequence>
463 →  </xsd:complexType>
```

*FIG. 4A*

```
465  <xsd:complexType name="srcIgnoreCaseType">
467    <xsd:sequence>
469      <xsd:element name="barrister" type="xsd:string"/>
471      <xsd:element name="RUBBISH" type="xsd:string"/>
473      <xsd:element name="SOLICITOR" type="xsd:string"/>
475      <xsd:element name="sHoP" type="xsd:string"/>
476    </xsd:sequence>
477  </xsd:complexType>

478  <xsd:complexType name="srcTokenizeType">
479    <xsd:sequence>
480      <xsd:element name="customerAddress" type="xsd:string"/>
481      <xsd:element name="retailShop" type="xsd:string"/> <!-- retail-business, Shop(shop)-store(Store) | businessStore-->
482      <xsd:element name="zipCode" type="xsd:string"/> <!-- zip-pin(Pin), (Code)code-number | pinNumber -->
483      <xsd:element name="ManufiCar" type="xsd:string"/> <!--Car(car)-sedan | sedanBMW -->
484      <xsd:element name="barrsitorSolicitorRubbishPark" type="xsd:string"/> <!-- mulitple tokens -->
485    </xsd:sequence>
486  </xsd:complexType>

487  <xsd:complexType name="negativeType">
488    <xsd:sequence>
489      <xsd:element name="schemaLocation" type="xsd:string"/> <!-- maps to personAddress on the source -->
490    </xsd:sequence>
491  </xsd:complexType>
492  </xsd:schema>
493  </xsd:complexType>

494  <xsd:complexType name="srcExactMatchType">
495    <xsd:sequence>
496      <xsd:element name="petrol" type="xsd:string" minOccurs="0"/>
498    </xsd:sequence>
499  </xsd:complexType>
```

*FIG. 4B*

501 → `<?xml version="1.0" encoding="UTF-8"?>`

503 → `<xsd:schema xmlns:xsd="http://www.w3.org/2001/XMLSchema"`
505 → `    targetNamespace="http://www.oracle.com/ProcessConnect/dictionaryTar"`
507 → `    xmlns="http://www.oracle.com/ProcessConnect/dictionaryTar">`
509 → `<xsd:annotation>`
511 → `<xsd:documentation>`
513 → `root --> tarContainer`
515 → `</xsd:documentation>`
517 → `</xsd:annotation>`

519 → `<xsd:element name="tarContainer" type="tarContainerType"/>`
521 → `<xsd:complexType name="tarContainerType">`
523 → `<xsd:sequence>`
525 → `<xsd:element name="tarExactMatch" type="tarExactMatchType"/>`
527 → `<xsd:element name="tarIgnoreCase" type="tarIgnoreCaseType"/>`
529 → `<xsd:element name="tarTokenize" type="tarTokenizeType"/>`
531 → `<xsd:element name="tarNegative" type="tarNegativeType"/>`
533 → `<xsd:element name="newDictionary" type="newDictionaryType"/>`

535 → `</xsd:sequence>`
537 → `</xsd:complexType>`

539 → `<xsd:complexType name="newDictionaryType">`
541 → `<xsd:sequence>`
543 → `<xsd:element name="xyz">`
545 → `<xsd:complexType>`
547 → `<xsd:sequence>`
549 → `<xsd:element name="CitY" type="xsd:string"/>`
551 → `<xsd:element name="street" type="xsd:string"/>`
553 → `</xsd:sequence>`
555 → `</xsd:complexType>`
557 → `</xsd:element>`
559 → `</xsd:sequence>`
561 → `</xsd:complexType>`

FIG. 5A

```
565 →  <xsd:complexType name="tarExactMatchType">
566 →    <xsd:sequence>
567 →      <xsd:element name="gasoline" type="xsd:string"/>
568 →      <xsd:element name="sedan" type="xsd:string"/>
569 →    </xsd:sequence>
570 →  </xsd:complexType>

571 →  <xsd:complexType name="tarIgnoreCaseType">
572 →    <xsd:sequence>
573 →      <xsd:element name="ATTORNEY" type="xsd:string"/>
574 →      <xsd:element name="garbage" type="xsd:string"/>
575 →      <xsd:element name="LAWYER" type="xsd:string"/>
576 →      <xsd:element name="StOrE" type="xsd:string"/>
577 →      <xsd:element name="free" type="xsd:string"/>
578 →    </xsd:sequence>
579 →  </xsd:complexType>

580 →  <xsd:complexType name="tarTokenizeType">
581 →    <xsd:sequence>
582 →      <xsd:element name="clientLocation" type="xsd:string"/>
583 →      <xsd:element name="businessStore" type="xsd:string"/>
584 →      <xsd:element name="numberPin" type="xsd:string"/>
585 →      <xsd:element name="sedanBMW" type="xsd:string"/>
586 →      <xsd:element name="garbageLawyerLawnAttorney" type="xsd:string"/>
587 →    </xsd:sequence>
588 →  </xsd:complexType>

589 →  <xsd:complexType name="tarNegativeType">
590 →    <xsd:sequence>
591 →      <xsd:element name="personAddress" type="xsd:string"/>
592 →      <xsd:element name="businessAddress" type="xsd:string"/>
593 →      <xsd:element name="officeAddress" type="xsd:string"/>
596 →      <xsd:element name="schemaAddress" type="xsd:string"/>
597 →    </xsd:sequence>
598 →  </xsd:complexType>
599 →</xsd:schema>
```

*FIG. 5B*

| TestDictionary.xml | Dictionary.xml | Dictionary-Dictionary.xml | TestDictionary-Dictionary.xml | exactnamety ▽ ▷ ✱ |

Source_dictionary_src.xsd

```
<source schema>
<o> srcContainer
    <o> srcExactMatch
        <o> Petrol
        <o> Car
    <o> srcIgnorCase
        <o> barrister
        <o> RUBBISH
        <o> SOLICITOR
        <o> sHOP
    <o> Address
        <o> personAddress
        <o> bussinessAddress
        <o> officeAddress
    <o> newDictionary
        <o> abc
        <o> city
        <o> street
```
↳ 615

Target_dictionary_tar.xsd

```
<target schema>        <o>
    tarContainer       <o>
    tarExactMatch      <o>
        gasoline       <o>
        sedan          <o>
    tarIgnoreCase      <o>
        ATTORNEY       <o>
        garbage        <o>
        LAWYER         <o>
        StOre          <o>
        free           <o>
        Address        <o>
        Office_Location
    newDictionary      <o>
        xyz            <o>
    City               <o>
    street             <o>
    CreationDate       <o>
```
↳ 635

GENERATING A SYNONYM DICTIONARY REPRESENTING A MAPPING OF ELEMENTS IN DIFFERENT DATA MODELS

RELATED APPLICATIONS

The present application is related to and claims priority from the co-pending India Patent Application entitled, "GENERATING A SYNONYM DICTIONARY REPRESENTING A MAPPING OF ELEMENTS IN DIFFERENT DATA MODELS", Serial Number: 1439/CHE/2005, Filed: 7 Oct. 2005, naming the same inventors as in the subject patent application.

BACKGROUND OF THE INVENTION

1. Field of the Invention

The present invention relates generally to software applications, and more specifically to a method and apparatus for generating a synonym dictionary representing a mapping of elements in different data models.

2. Related Art

A data models generally defines a structure using which data of interest can be stored or represented. Typically, the structure contains a set of elements ("schema elements") of corresponding types, and potentially the order and inter-relationship between the schema elements. For example, a data model may represent the columns of a table in a relational database, and more complex hierarchical structures in extended meta language (XML), object oriented programming, etc.

Different data models are often used by different applications, possibly representing some overlapping information (with corresponding overlap of elements). For example, a payroll application may contain the employee names and identifiers, in addition to salary, amounts paid, dates, etc, using a corresponding schema ("payroll schema"). Similarly, a human resources (HR) application may also contain the employee names and identifiers, in addition to join date, title, qualifications, etc., using another schema ("HR schema").

There is a recognized need to map elements of different schemas. For example, there are several situations in which complex applications are developed independently (without coordination) potentially on different software platforms (e.g., Enterprise Resource Planning (ERP), Customer Relationship Management (CRM)), and efforts are made much later to inter-operate (or integrate) the two applications. At least to correlate the data of the applications, there is a need to map the elements, and such mapped elements may be referred to as "synonyms" (in the context of the two applications).

In one prior approach, users map all the data elements manually, often using suitable computer generated user interfaces. The manual mapping is also repeated for each pair of data models sought to be mapped.

In general, manual approaches require human effort, which typically adds to the overall cost and also could take more time. What is therefore needed is an improved method and apparatus for generating a synonym dictionary representing a mapping of elements in different data models.

BRIEF DESCRIPTION OF THE DRAWINGS

The present invention will be described with reference to the accompanying drawings briefly described below.

FIGS. 4A and 4B together contain the definition of a schema used to illustrate the operation of an embodiment of the present invention.

FIGS. 5A and 5B together contain the definition of another schema used to illustrate the operation of an embodiment of the present invention.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE PREFERRED EMBODIMENTS

1. Overview

An aspect of the present invention receives data indicating a mapping of a pair of data elements of different schemas, and infers pairs of synonyms (based on the received mapping data) for addition to a synonym dictionary. The inferred pairs are added to the synonym dictionary. In an embodiment, mappings are received based on user inputs.

According to an aspect of the present invention, the mapped elements of a pair are added to the synonym dictionary if the pair cannot be determined according to a program logic. The program logic may be designed to examine the mapped elements for identical or similar spellings, with or without case sensitivity, according to user inputs. If the program logic cannot determine that the mapped elements are synonyms, the pair is added to the synonym dictionary.

According to another aspect of the present invention, another program logic determines whether the respective parents ("parent elements") of mapped elements can be inferred (with a probability exceeding a threshold) to be synonyms, and adds the inferred pair to the synonym dictionary. In general, when multiple children of a parent element are mapped, the corresponding probability is considered higher.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the features of the invention.

2. Example Environment

Figure 1:
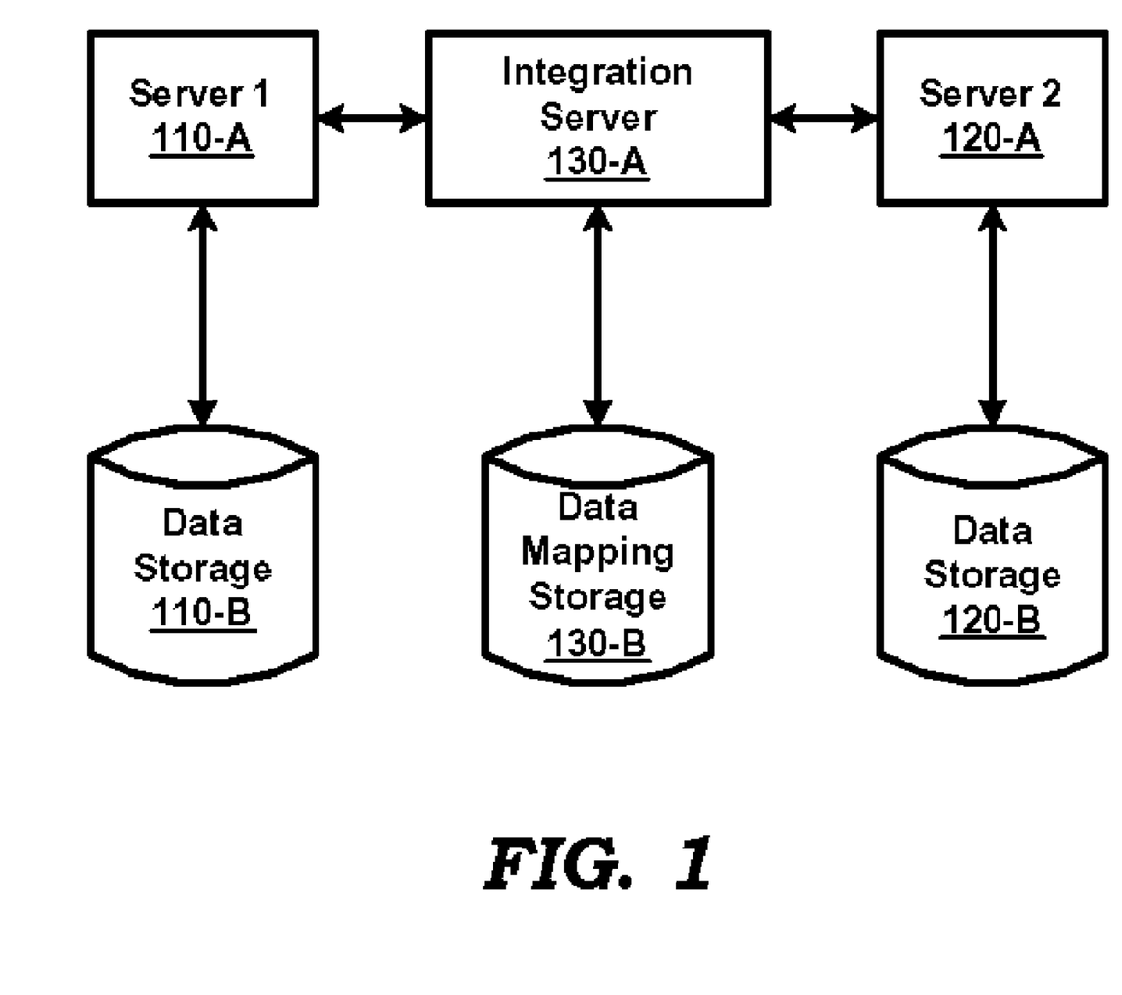
FIG. 1 is a block diagram of an example environment in which various aspects of the present invention can be implemented.

FIG. 1 is a block diagram of an example environment illustrating the need for a synonym dictionary generated according to various aspects of the present invention. The environment is shown containing servers 110A and 120A, data storages 110B, 120B, and 130B, and integration server 130A. Only representative components (in number and kind) are shown for illustration. Each block of FIG. 1 is described below in further detail.

Server 110A executes a user application (e.g., using software platforms such as CRM applications, ERP Applications) while accessing the corresponding information stored in data storage 110B. Similarly, server 120A executes another user application while accessing the corresponding information stored in data storage 120B.

Data storage 110B and data storage 120B store corresponding information according to respective data models. Each data model in turn contains schema elements as noted above in the background section. Various data elements are stored in the data storage consistent with the corresponding data model.

Integration block 130A facilitates either inter-operation of the applications executing on servers 110A and 120A, or alternatively provides new features by using the information in both data storages 110B and 120B. At least to facilitate the operation of integration block 130A, it may be desirable to map the (schema) elements of the schemas using which the information in data storages 110B and 120B is stored. The mapping of the schema elements may be received from data storage 130B.

The manner in which such mapping can be simplified according to various aspects of the present invention is described below in further detail.

3. Digital Processing System

Figure 2:
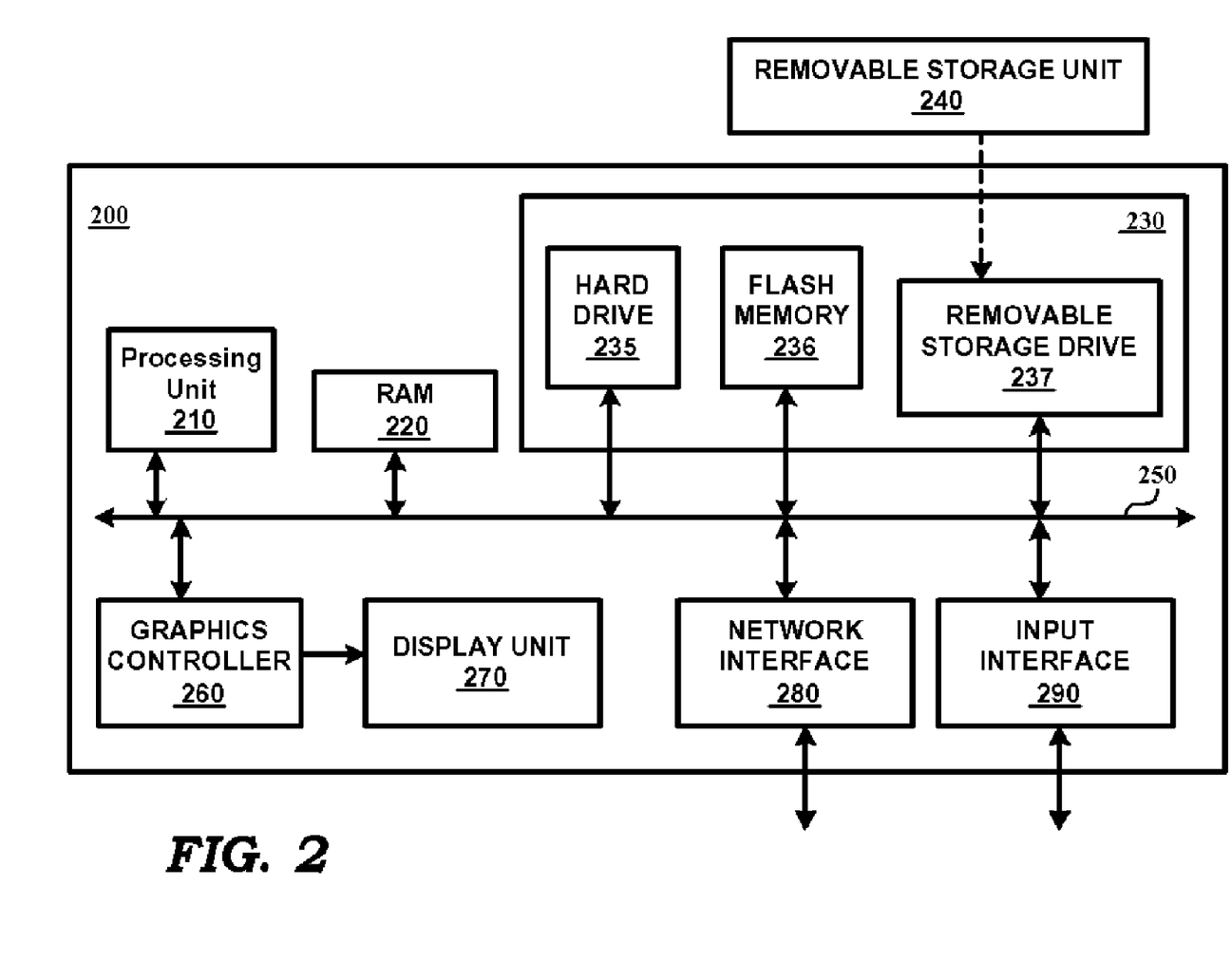
FIG. 2 is a block diagram illustrating an example embodiment in which various aspects of the present invention are operative when software instructions are executed.

FIG. 2 is a block diagram illustrating the details of a digital processing system using which a "synonym dictionary" is generated according to various aspects of the present invention. As will be described below in further detail, the synonym dictionary contains synonym pairs inferred from various data element maps. The synonym dictionary thus generated can be used to simplify the mapping of schema elements when mapping new schema pairs, for example, in known ways.

Digital processing system 200 may contain one or more processors such as central processing unit (CPU) 210, random access memory (RAM) 220, secondary memory 230, graphics controller 260, display unit 270, network interface 280, and input interface 290. All the components except display unit 270 may communicate with each other over communication path 250, which may contain several buses as is well known in the relevant arts. The components of FIG. 2 are described below in further detail.

CPU 210 may execute instructions stored in RAM 220 to provide several features of the present invention. CPU 210 may contain multiple processing units, with each processing unit potentially being designed for a specific task. Alternatively, CPU 210 may contain only a single general purpose processing unit. RAM 220 may receive instructions from secondary memory 230 using communication path 250.

Graphics controller 260 generates display signals (e.g., in RGB format) to display unit 270 based on data/instructions received from CPU 210. Display unit 270 contains a display screen to display the images defined by the display signals. Input interface 290 may correspond to a key-board and/or mouse. Network interface 280 provides connectivity to a network (e.g., using Internet Protocol), and may be used to communicate with the other systems of FIG. 1.

Secondary memory 230 may contain hard drive 235, flash memory 236 and removable storage drive 237. Secondary memory 230 may store the data (e.g., the data models sought to be mapped, as well as synonym dictionary generated according to various aspects of the present invention) and software instructions, which enable system 200 to provide several features in accordance with the present invention.

Some or all of the data and instructions may be provided on removable storage unit 240, and the data and instructions may be read and provided by removable storage drive 237 to CPU 210. Floppy drive, magnetic tape drive, CD-ROM drive, DVD Drive, Flash memory, removable memory chip (PCMCIA Card, EPROM) are examples of such removable storage drive 237.

Removable storage unit 240 may be implemented using medium and storage format compatible with removable storage drive 237 such that removable storage drive 237 can read the data and instructions. Thus, removable storage unit 240 includes a computer readable storage medium having stored therein computer software and/or data.

In this document, the term "computer program product" is used to generally refer to removable storage unit 240 or hard disk installed in hard drive 235. These computer program products are means for providing software to system 200. CPU 210 may retrieve the software instructions, and execute the instructions to provide various features of the present invention, as described below.

3. Method

Figure 3:
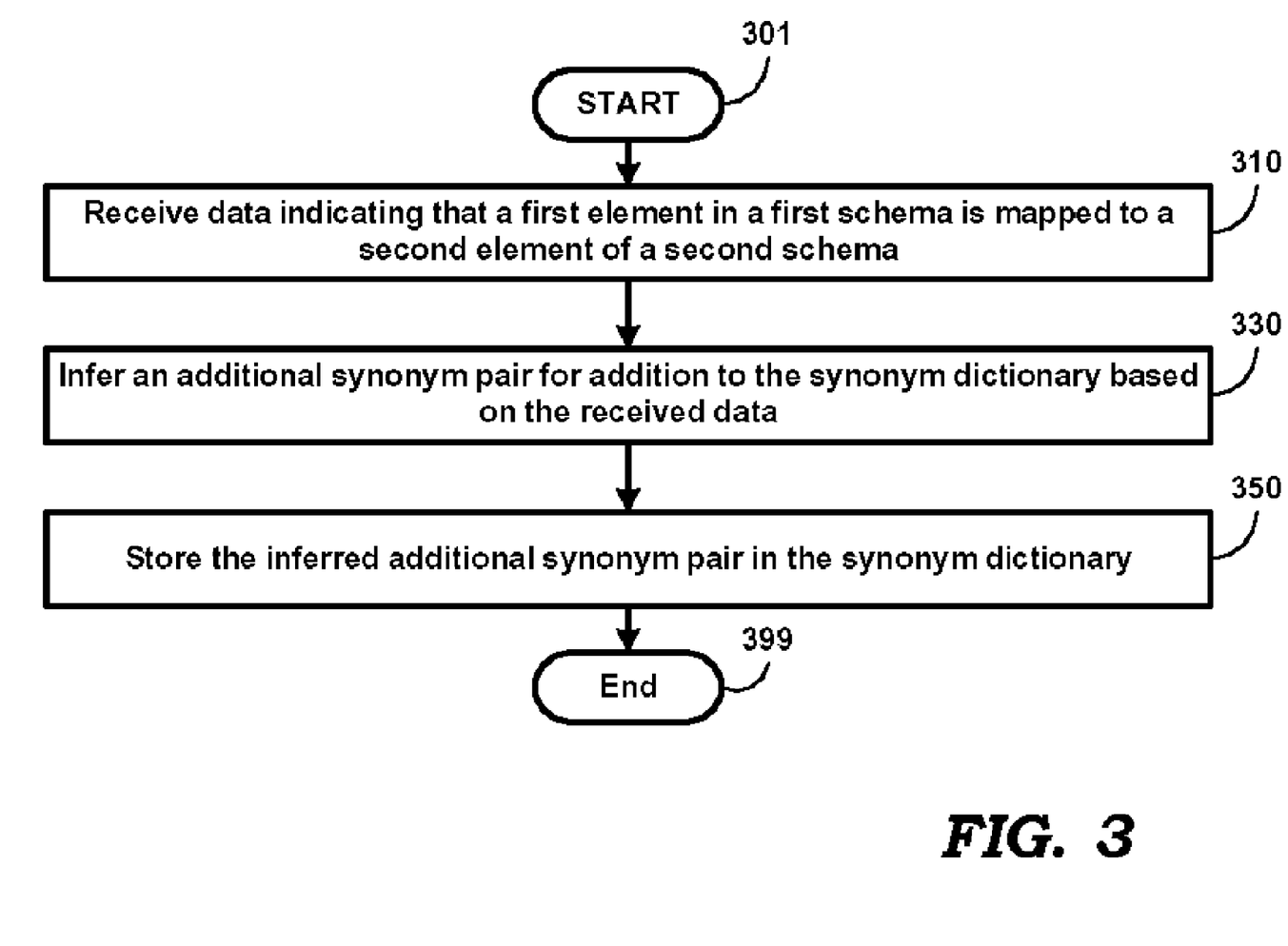
FIG. 3 is a flowchart illustrating the manner in which synonym pairs are added to a synonym dictionary according to various aspects of the present invention.

FIG. 3 is a flowchart illustrating the manner in which digital processing system 200 may generate a synonym dictionary according to various aspects of the present invention. The flowchart is described with respect to FIGS. 1 and 2 merely for illustration. However, the approach(es) can be implemented in other systems/environments as well. The flowchart begins in step 301, in which control passes to step 310.

In step 310, digital processing system 200 receives data indicating that a first (schema) element of a first schema is mapped to a second (schema) element of a second schema. With reference to the environment of FIG. 1, the data may indicate that a schema element in a schema used in data storage 110B is mapped to another schema element in a schema used in data storage 120B. Data representing the mapping of the first data element to the second data element may be received after a user specifies the mapping (as described in sections below), or alternatively from other sources such as a file [i.e. xsl or xquery] which contains the mapping information for the pair of schemas.

In step 330, digital processing system 200 infers an additional synonym pair for addition to the synonym dictionary based on the received data. Various techniques can be used for such inference. In an embodiment described below, each mapped pair is considered as a synonym pair (for addition) if the mapped pair cannot be programmatically inferred otherwise. Pairs other than the mapped pair can also be inferred to be synonyms from the mapped data. For example, as described in sections below, the respective parents (ancestors, in general), consistent with the schema definition, of the mapped elements are considered as candidates for addition as synonym pairs.

In step 350, digital processing system 200 stores the inferred additional synonym pair into the synonym dictionary. The synonym dictionary may be stored in removable storage drive 237, and used for mapping of additional schemas. Control passes to step 399, where the flowchart ends.

The approach described above can be implemented to generate synonym dictionaries based on various schemas, with corresponding formats. The schemas being mapped can potentially have different formats. The description is continued with an example schemas files from which synonym dictionary is generated according to various aspects of the present invention.

4. Example Schemas

FIGS. 4A-4B and 5A-5B respectively contain two schema definitions in Extended Markup Language (XML) Schema definition (XSD). Only the portions of the schemas as relevant to an understanding of the features of the present invention are included for conciseness. FIGS. 4A and 4B together represent a schema 'dictionarySrc' (as indicated by lines 405 and 407). The schema of FIGS. 4A and 4B described briefly below.

Line 401 indicate that the schema definition is according to xml version 1.0 with encoding of UTF-8. The schema definition is indicated to be available in a web page with a URL as indicated in lines 403.

Line 409 indicates that the root element of the hierarchy of the schema is 'srcContainer', which is of type 'srcContainerType'. Lines 411-427 contain data type definition of the remaining hierarchy of schema elements in the schema file.

The first level of schema elements (below the root) are indicated in lines 415, 417, 419, 421 and 423 as 'srcExactMatch', 'srcIgnoreCase', 'nweDictionary', 'srcTokenize' and 'negative' with corresponding data types as 'srcExactMatchType', 'srcIgnoreCaseType', 'newDictionaryType', 'srcTokenizeType' and 'negativeType' respectively. The element names and types are conveniently selected with descriptive labels indicating the specific purpose the corresponding schema elements serve (as described in sections below).

Lines 429-451 represent the hierarchy of schema elements under 'newDictionary' with a schema element 'abc' (line 433, "parent") with child schema elements 'city' and 'street' as in lines 439 and 441 respectively.

In a similar manner, lines 453-463, 465-477, 478-486, 487-493 and 495-499 indicate corresponding hierarchy of schema elements under 'srcExactMatch', 'srcIgnoreCase', 'srcTokenize', 'negative' and 'srcExactMatch'.

Figure 5A:
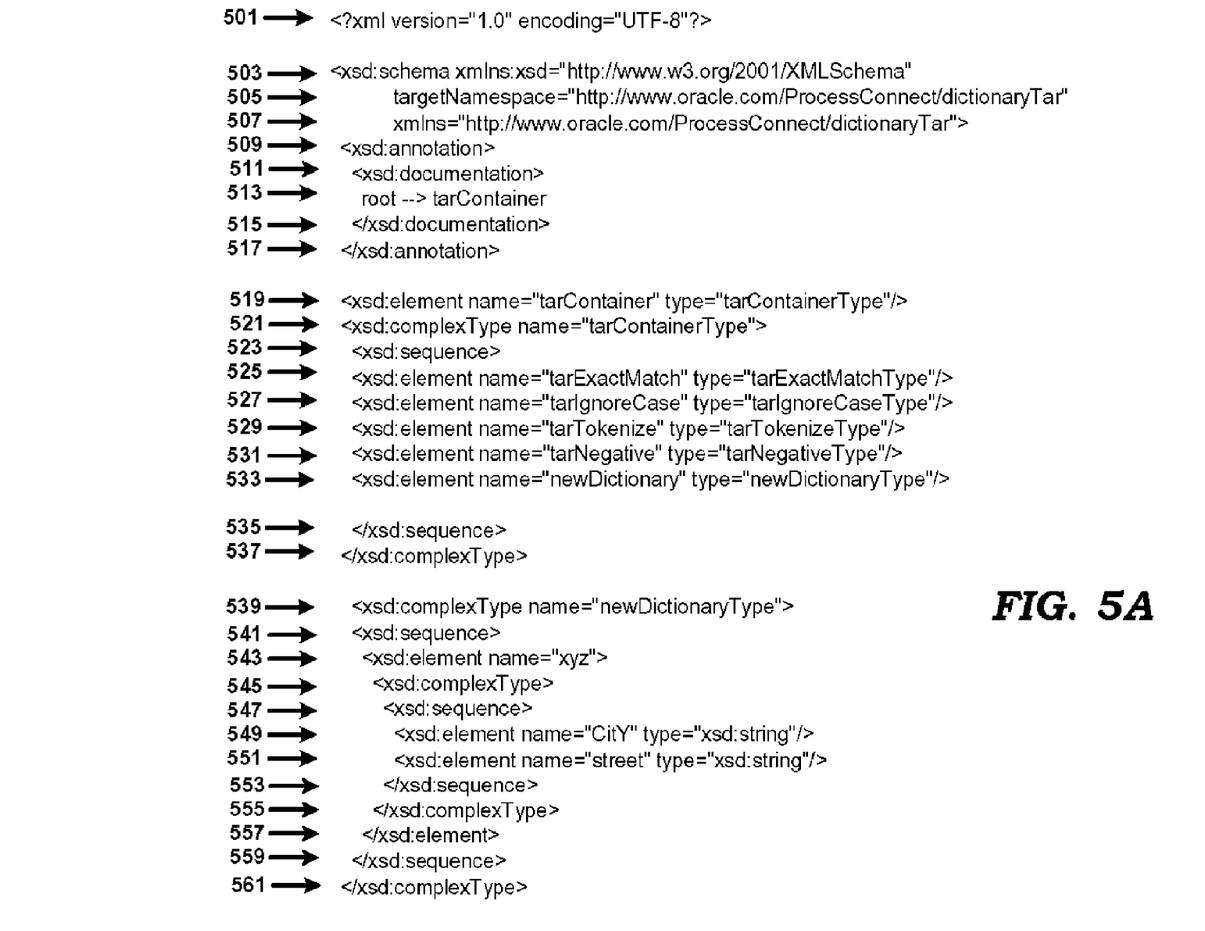

FIGS. 5A and 5B together represent a schema 'dictionaryTar' (as indicated in lines 505 and 507). Conveniently, the corresponding (compared to schema definition of FIGS. 4A and 4B) labels in the higher levels are shown with Src replaced by Tar. Schema elements in the schema file of FIGS. 5A and 5B are described briefly below.

Line 501 indicates that the schema definition is according to xml version 1.0 with encoding of UTF-8. The schema is available in a web page with a URL, as indicated in line 503.

Lines 509-519 indicate that the root element in the schema is 'tarContainer'. Line 519 indicates that the root element of the hierarchy of the schema is 'tarContainer', which is of type 'tarContainerType. Lines 521-537 indicate data type definition of the various higher level schema elements in the schema file.

Ancestor/parent schema elements are indicated in lines 525, 527, 529, 531 and 533 as 'tarExactMatch', 'tarIgnoreCase', 'tarTokenize', 'tarNegative' and 'newDictionary' with a corresponding data type as 'tarExactMatchType', 'tarIgnoreCaseType', 'tarTokenizeType' and 'tarNegativeType' and 'newDictionaryType'.

Lines 539-561 represent the hierarchy of schema elements under 'newDictionary' with an ancestor schema element 'xyz' (line 543) with the corresponding schema elements 'city' and 'street' (leaf elements) as in lines 549 and 551 respectively.

In a similar manner, lines 565-570, 571-579, 580-588, 589-599 indicate corresponding hierarchy of schema elements under 'tarExactMatch', 'tarIgnoreCase', 'tarTokernize' and 'tarNegative'.

The description is continued with an illustration of how schema elements of the different schemas (of above) are mapped and the manner in which additional synonym pairs are added to a synonym dictionary in an embodiment of the present invention.

5. Mapping of Schema Elements

Figure 6A:
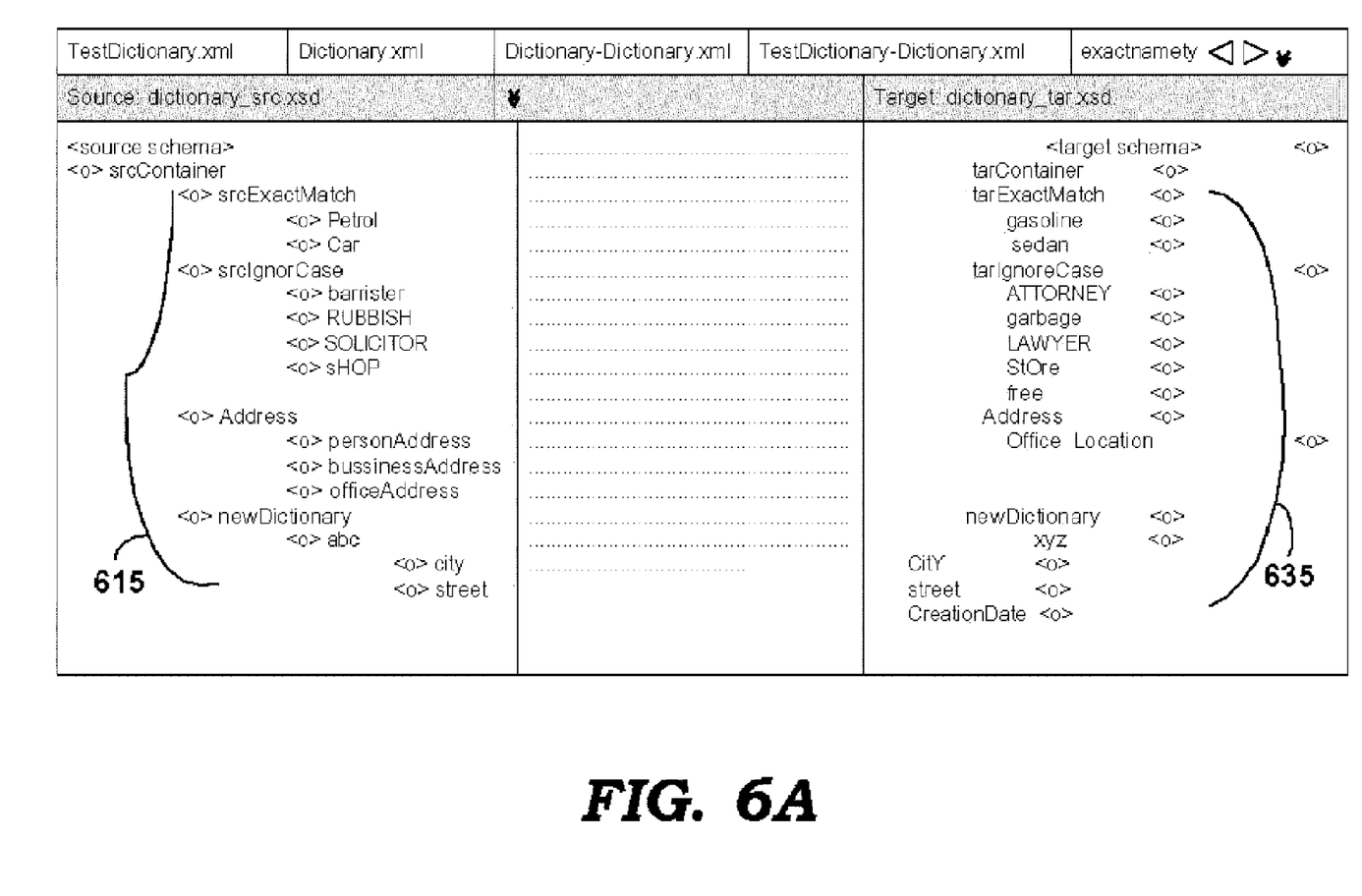
FIG. 6A depicts an interface using which the schema elements sought to be mapped are displayed in an embodiment of the present invention.
Figure 6B:
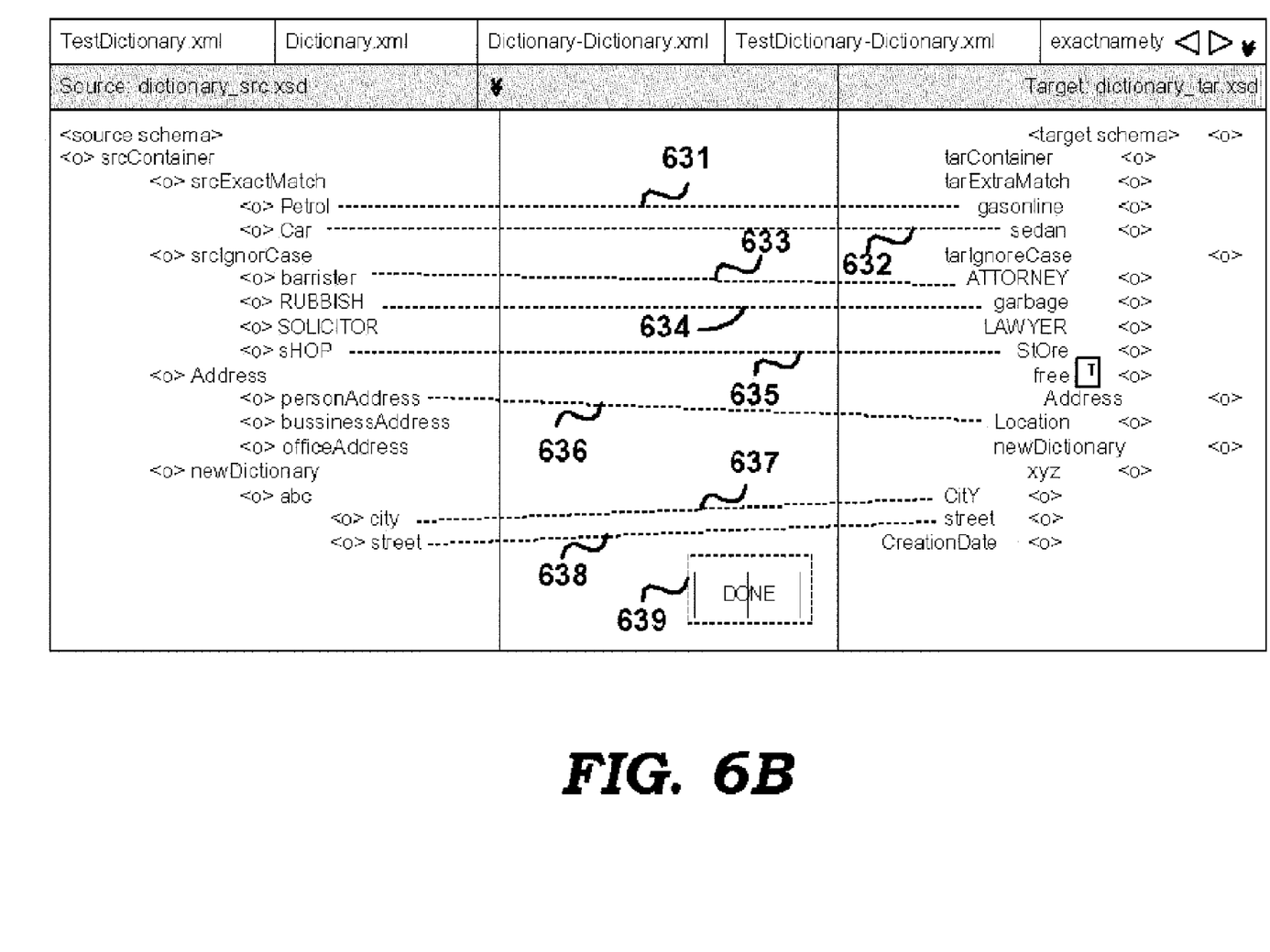
FIG. 6B depicts the element pairs mapped by a user in an embodiment of the present invention.

FIGS. 6A and 6B together illustrate an example user interface using which a user may map the schema elements of schema contained in FIGS. 4A-4B to corresponding schema elements of the schema (of FIGS. 5A-5B). In particular, FIG. 6A contains the graphical representation of the some of the schema elements of the two schema files (in two XSD files) and FIG. 6B contains the mapping of some of the schema elements of the two schemas. The mapped elements are then used to infer additional synonym pairs to be added to a synonym dictionary, as described in sections below.

Continuing with reference to FIG. 6A, portion 615 contains the schema elements of dictionary_src.xsd (of FIGS. 4A and 4B) and portion 635 contains the schema elements of dictionary_tar.xsd. As may be appreciated, schema elements in portion 615 have a root element with the name 'srcContainer' according to the definition in line 409, while schema elements in portion 635 have a corresponding root element 'tarContainer' according to the definition in line 513.

The display in portions 615 and 635 contains the same hierarchy as that represented by XSD of FIGS. 4A/4B and 5A/5B respectively. For example, schema elements 'Petrol' and 'Car' (leaf nodes) in portion 615 appear (indented) below schema element 'srcExactMatch' (parent for "Petrol" and "car", and child for srcContainer) according to the corresponding definition in lines 453-463. Similarly, schema elements 'gasoline' and 'sedan' (in portion 635) appear as leaf nodes as children to below the schema element 'tarExactMatch' according to the corresponding definition in lines 565 to 570.

Once the display of FIG. 6A is generated, a user may map the schema elements from the two schemas using an appropriate interface. For example, 'mouse' type hardwares can be used to specify the mapping of each pair of elements. The resulting display is illustrated in FIG. 6B.

FIG. 6B contains a graphical representation indicating the specific schema of elements of portion 615 mapped to the corresponding schema elements in portion 635 by a user (manually). Each mapped pair is described briefly below.

Line 631 indicates that schema element 'petrol' in the schema 'dictionary_src.xsd' is mapped to the schema element 'gasoline' of the schema 'dictionary_tar.xsd'. Similarly, line 632 indicates that schema element 'car' is mapped to the schema element 'sedan'.

Lines 633-635 indicate the mapping of some of the schema elements under the ancestor schema element 'srcIgnoreCase' (in portio 615) to the corresponding schema elements under the ancestor schema element 'tarIgnoreCase'. Line 633 indicates that schema element 'barrister' is mapped to the schema element 'ATTORNEY' of the second data dictionary in block 625).

Line 634 indicates that schema element 'RUBBISH' is mapped to the schema element 'garbage' of the second data dictionary in portion 625, and line 635 indicates that schema element 'sHoP' is mapped to the schema element 'StOrE' of the second data dictionary in block 625.

Similarly, lines 636, 37 and 638 respectively indicate the mappings of schema elements 'person Address' to 'Location', 'city' to 'city' and 'street' to 'street' respectively. After completing the mappings, the user clicks on Add button.

In an embodiment, data representing the mappings (represented by lines 631-638) is received by digital processing system 200, which processes the data according to step 310 to infer the synonyms. Additional synonyms can be immediately generated.

However, in an alternative embodiment, digital processing system 200 automatically proposes (maps) additional schema element pairs from the received mappings (621-638). The results of such auto-mapping are not described in further detail, as not being relevant to the features of the present invention. However, the generation of additional synonyms (for addition to the synonym dictionary) in such an embodiment is tied to some preferences a user may specify, and accordingly the description is continued with respect to corresponding user interface.

6. Preferences

Figure 7:
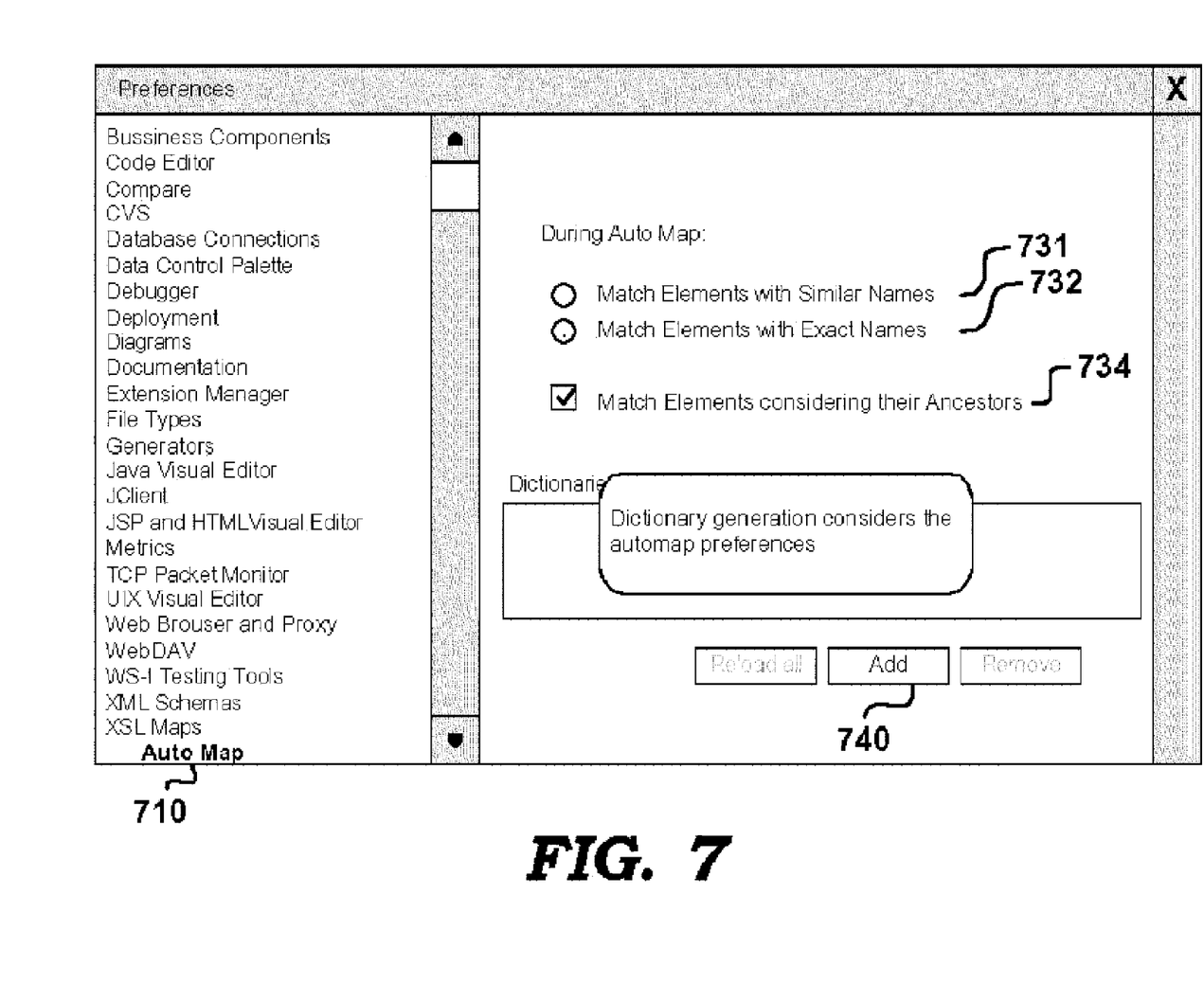
FIG. 7 is a graphical interface using which user may specify preferences to be used while inferring additional synonyms.

FIG. 7 illustrates a user interface which a user may be provided to indicate preferences considered for auto-mapping, which indirectly specifies the features for inferring additional synonym pairs in an embodiment. It should be appreciated that the preferences for synonym pair generation can be specified directly, as well, in alternative embodiments.

Continuing with respect to FIG. 7, on selecting the tab 710 'Auto Map', the input form of FIG. 7 is displayed. User may enable/disable selection of a preference by either checking or un-checking of the corresponding control. Each of the controls of FIG. 7 are described below briefly.

A user may select one of radio button controls 731 and 732. If control 731 is selected, 'similar' schema elements are auto-mapped, and if control 732 is selected, only exact schema elements (including identical case and spelling) are auto-mapped. In case of selection of control 731, schema elements (of different schemas) are considered similar if the elements differ only in case, if one is sub-string of the other, or if there is overlap of tokens contained in the schema elements. In an embodiment, in case of words joined as single word using camelcase, each of such individual words (e.g., company and name in companyName) are determined to be tokens. Similarly, characters such as '–' (dash or minus) and '_' (underscore) may also be used as delimiters in determining tokens.

Check-box control 734 determines whether schema elements higher in the hierarchy (ancestors/parents) of schema elements are to be considered for inference as synonyms. Hierarchy of the schema elements is considered for inferring synonyms, since control 734 is selected.

Figure 8:
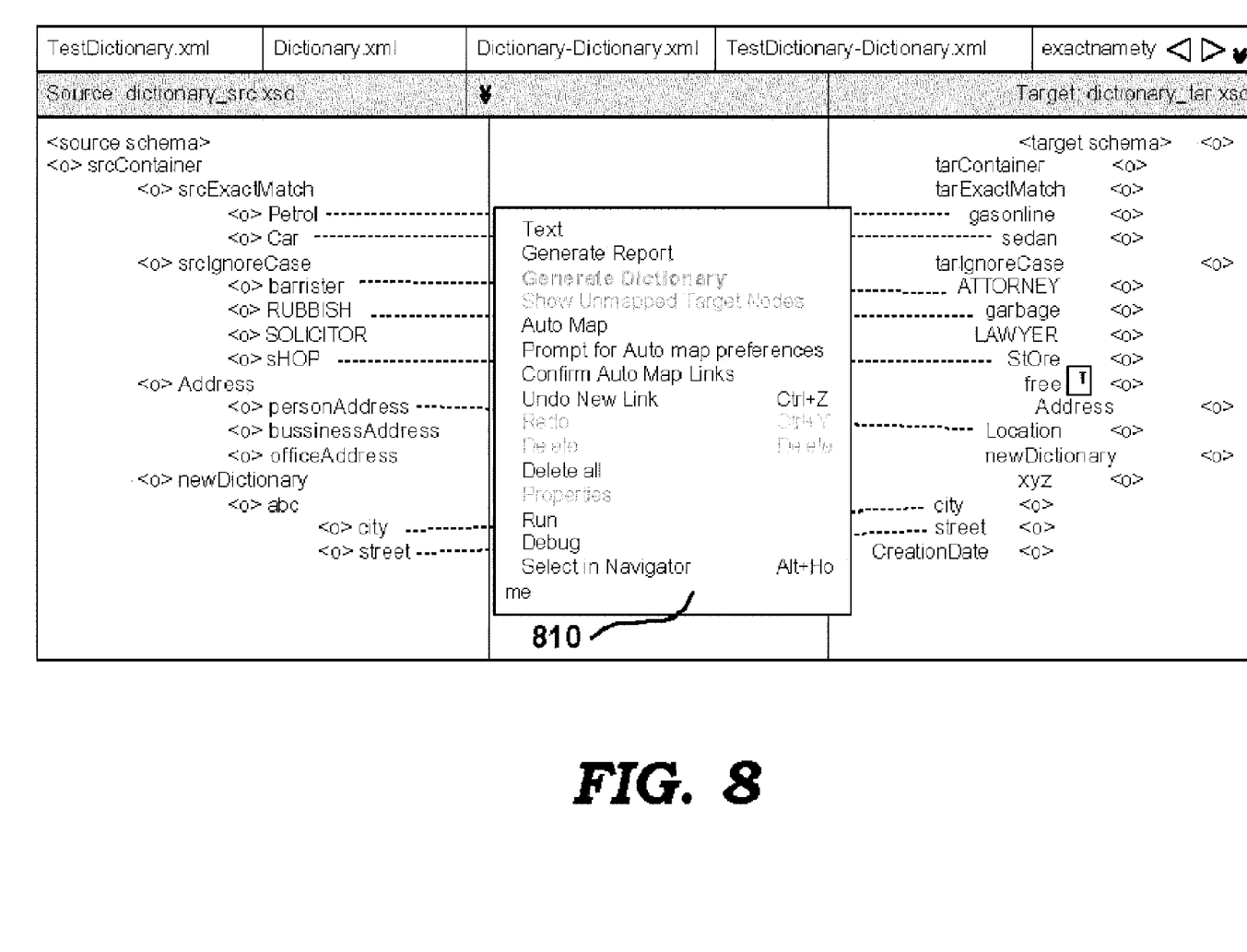
FIG. 8 is a graphical interface using which user may cause addition of additional synonyms from the mapped schema elements in an embodiment of the present invention.

Once the user specifies the preferences, the user may select Add button 740 to cause the screen of FIG. 8 to be displayed. Sub-window 810 is shown super-imposed on the display of FIG. 6B, and the user may select the 'Generate Dictionary Option' to cause the additional synonym pairs to be added to the synonym dictionary. The resulting additions are shown in FIG. 9 and the corresponding processing logic is also described below.

7. Additions to Synonyms Dictionary

Figure 9:
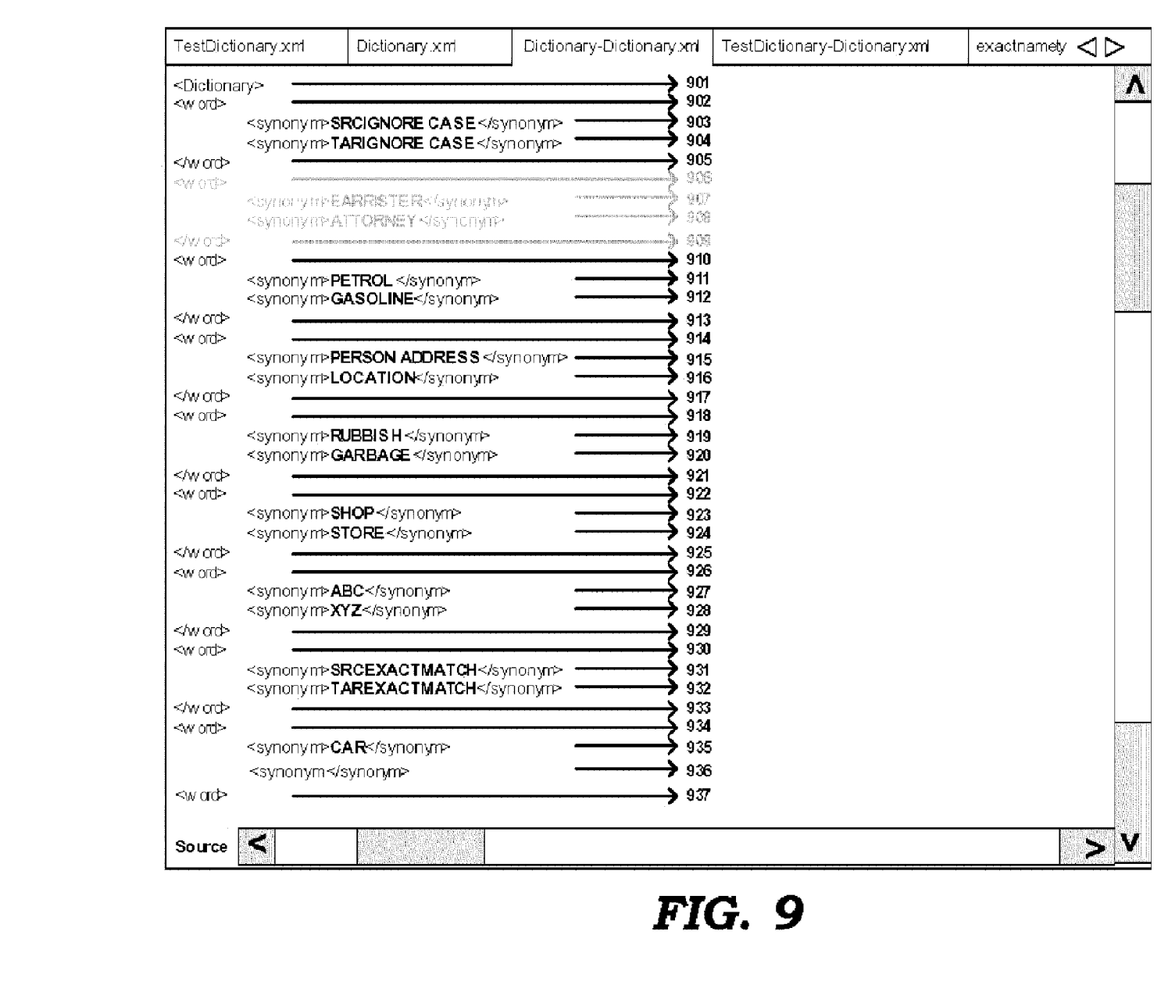
FIG. 9 is a text file representing a synonyms dictionary illustrating additional synonyms which are added in an example embodiment of the present invention.

FIG. 9 contains a text file in XML format depicting the additional synonyms inferred from the received details of data mappings of FIG. 6B. For simplicity, merely the inferred synonyms are shown in FIG. 9. The lines in the synonym dictionary are described briefly below.

According to an aspect of the present invention, digital processing system 200 determines whether each mapped pair (631-638) can be determined to be a synonym pair according to a program logic. The program logic may further be based on user specified inputs. A mapped pair is added as a synonym pair only if the mapped pair cannot be determined to be a synonym pair (or cannot be auto-mapped) using the program logic.

In an embodiment, the program logic operates according to the user inputs specified in FIG. 7 consistent with the auto-mapping logic. Thus, if control 732 is checked, the program logic determines that a mapped pair can be inferred as synonyms only if the spellings and case are identical for the mapped elements. Assuming control 732 is checked, city (of first schema of FIG. 4A) would be added as a synonym of City (of second schema of FIG. 5A) since the elements have different case. However, the pair is not shown in FIG. 9, since control 732 is not checked (and 731 is checked).

Thus, the pair of mapped elements are added to the synonym dictionary if the pair cannot be auto-mapped. As may be readily appreciated, the mapped pairs of lines 431-436 cannot be auto-mapped, even with the expansive selection of control 732. Accordingly, the corresponding synonym pairs (Petrol-Gasoline, Car-Sedan, Barrister-Attorney, Rubbish-Garbage, Shop-Store, PersonAddress-Location) are shown added to the synonym dictionary of FIG. 9.

According to another aspect of the present invention, the parents of mapped elements are also considered for candidates as synonym pairs if user selects control 734. In an embodiment, the parent pair is considered a synonym pair if at least half the children (at lower level) are either mapped (either auto-map or manually) or considered synonyms.

Thus, SRCIGNORECASE is shown as a synonym of TARIGNORECASE (in lines 702-705) both the corresponding children are respectively mapped (as indicated in lines 434 and 435).

Similarly, schema element pair 'ABC','XYZ' is shown added as synonym pair (in lines 726-729) due to the mapping of the respective child elements. As may be appreciated, the child elements 'city', 'street' under 'ABC' are mapped respectively to the corresponding child element 'city', 'street' under 'XYZ'. Additionally, 'SRCEXACTMATCH', and 'TAREXACTMATCH' is shown added as synonyms due to the mapping of the respective child elements. ('Petrol' to 'Gasoline' and 'car' to 'sedan').

8. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents. Also, the various aspects, features, components and/or embodiments of the present invention described above may be embodied singly or in any combination in a data storage system such as a database system and a data warehouse system.

What is claimed is:

1. A method of updating a synonym dictionary containing a set of synonym pairs, each of said synonym pairs containing a schema element of a first schema and another schema element of a second schema indicating a mapping between the two schema elements, said method comprising:
   receiving data representing a first schema element in said first schema is mapped to a second schema element in said second schema;
   checking whether a program logic would auto-map said first schema element to said second schema element;
   adding said first schema element and said second schema element as an additional synonym pair to said synonym dictionary if said program logic would not auto-map said first schema element to said second schema element and not adding said additional synonym pair otherwise; and
   using said synonym dictionary with said added additional pair to map elements of new schema pairs.

2. The method of claim 1, wherein a user maps said first schema element to said second schema element and said data is received after said user maps said first schema element to said second schema element.

3. The method of claim 2, wherein said program logic receives as inputs whether said first schema element needs to be identical to said second schema element to auto-map or similarity is sufficient to auto-map,
   wherein said program logic determines that said first schema element would be auto-mapped to said second schema element only if said first schema element is identical to said second schema element if said inputs indicate that said first schema element needs to be identical to said second schema element,
   otherwise said program logic determines that said first schema element would be auto-mapped to said second schema element if said first schema element is similar to said second schema element if said inputs indicate that said first schema element needs to be only similar to said second schema element.

4. The method of claim 3, wherein said similarity comprises one or more of ignoring case and having a common sub-string.

5. The method of claim 3, wherein said inputs further indicates whether ancestors are to be considered for addition to said synonym dictionary, said method further comprising:
   determining whether a third schema element in said first schema and a fourth schema element in said second schema have at least half their children mapped,
      wherein said third schema element and said fourth schema element are respective parents of said first schema element and said second schema element,
      wherein said adding adds said third schema element and said fourth schema element as another additional synonym pair to said synonym dictionary if at least half their children are determined to have been mapped.

6. A computer readable medium storing one or more sequences of instructions causing a server to update a synonym dictionary containing a set of synonym pairs, each of said synonym pairs containing a schema element of a first schema and another schema element of a second schema indicating a mapping between the two schema elements, wherein execution of said one or more sequences of instructions by one or more processors contained in said server causes said server to perform the actions of:
   receiving data representing a first schema element in said first schema is mapped to a second schema element in said second schema;
   checking whether a program logic would auto-map said first schema element to said second schema element;
   adding said first schema element and said second schema element as an additional synonym pair to said synonym dictionary if said program logic would not auto-map said first schema element to said second schema element and not adding said additional synonym pair otherwise; and
   using said synonym dictionary with said added additional pair to map elements of new schema pairs.

7. The computer readable medium of claim 6, wherein a user maps said first schema element to said second schema element and said data is received after said user maps said first schema element to said second schema element.

8. The computer readable medium of claim 6, wherein said program logic receives as inputs whether said first schema element needs to be identical to said second schema element to auto-map or similarity is sufficient to auto-map,
   wherein said program logic determines that said first schema element would be auto-mapped to said second schema element only if said first schema element is identical to said second schema element if said inputs indicate that said first schema element needs to be identical to said second schema element,
   otherwise said program logic determines that said first schema element would be auto-mapped to said second schema element if said first schema element is similar to said second schema element if said inputs indicate that said first schema element needs to be only similar to said second schema element.

9. The computer readable medium of claim 8, wherein said similarity comprises one or more of ignoring case and having a common sub-string.

10. The method of claim 8, wherein said inputs further indicates whether ancestors are to be considered for addition to said synonym dictionary, said method further comprising:
    determining whether a third schema element in said first schema and a fourth schema element in said second schema have at least half their children mapped,
       wherein said third schema element and said fourth schema element are respective parents of said first schema element and said second schema element,
       wherein said adding adds said third schema element and said fourth schema element as another additional synonym pair to said synonym dictionary if at least half their children are determined to have been mapped.

11. A computer system updating a synonym dictionary containing a set of synonym pairs, each of said synonym pairs containing a one schema element of a first schema and another schema element of a second schema indicating a mapping between the two schema elements, said computer system comprising:
    means for receiving data representing a first schema element in said first schema is mapped to a second schema element in said second schema;
    means for checking whether a program logic would auto-map said first schema element to said second schema element;
    means for adding said first schema element and said second schema element as an additional synonym pair to said synonym dictionary if said program logic would not auto-map said first schema element to said second schema element and not adding said additional synonym pair otherwise; and
    means for using said synonym dictionary with said added additional pair to map elements of new schema pairs.

12. The computer system of claim 11, wherein a user maps said first schema element to said second schema element and said data is received after said user maps said first schema element to said second schema element.

13. The computer system of claim 12, wherein said program logic receives as inputs whether said first schema element needs to be identical to said second schema element to auto-map or similarity is sufficient to auto-map, wherein said program logic determines that said first schema element would be auto-mapped to said second schema element only if said first schema element is identical to said second schema element if said inputs indicate that said first schema element needs to be identical to said second schema element, otherwise said program logic determines that said first schema element would be auto-mapped to said second schema element if said first schema element is similar to said second schema element if said inputs indicate that said first schema element needs to be only similar to said second schema element.

14. The computer system of claim 13, wherein said inputs further indicates whether ancestors are to be considered for addition to said synonym dictionary, said computer system further comprising:

means for determining whether a third schema element in said first schema and a fourth schema element in said second schema have at least half their children mapped, wherein said third schema element and said fourth schema element are respective parents of said first schema element and said second schema element, wherein said adding adds said third schema element and said fourth schema element as another additional synonym pair to said synonym dictionary if at least half their children are determined to have been mapped.

* * * * *

UNITED STATES PATENT AND TRADEMARK OFFICE
CERTIFICATE OF CORRECTION

PATENT NO. : 7,600,186 B2
APPLICATION NO. : 11/164362
DATED : October 6, 2009
INVENTOR(S) : Rakesh Saha et al.

It is certified that error appears in the above-identified patent and that said Letters Patent is hereby corrected as shown below:

On sheet 10 of 12, in Figure 7, line 21, delete "Brouser" and insert -- Browser --, therefor.

In column 5, line 62, delete "'tarContainerType." and insert -- 'tarContainerType'. --, therefor.

In column 6, line 66, delete "portio 615" and insert -- portion 615 --, therefor.

Signed and Sealed this

Tenth Day of August, 2010

David J. Kappos
*Director of the United States Patent and Trademark Office*